United States Patent
Wen et al.

(10) Patent No.: US 10,237,629 B2
(45) Date of Patent: Mar. 19, 2019

(54) CHANNEL CLASSIFICATION METHODS AND DEVICES

(71) Applicant: STARTIMES COMMUNICATION NETWORK TECHNOLOGY CO., LTD., Beijing (CN)

(72) Inventors: Jiangtao Wen, Beijing (CN); Yi Pang, Beijing (CN); Liang Zhang, Beijing (CN); Hongwei Yao, Beijing (CN)

(73) Assignee: STARTIMES COMMUNICATION NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/309,159

(22) PCT Filed: Apr. 13, 2015

(86) PCT No.: PCT/CN2015/076410
§ 371 (c)(1),
(2) Date: Nov. 4, 2016

(87) PCT Pub. No.: WO2015/169141
PCT Pub. Date: Nov. 12, 2015

(65) Prior Publication Data
US 2017/0078766 A1    Mar. 16, 2017

(30) Foreign Application Priority Data

May 5, 2014  (CN) .......................... 2014 1 0186939

(51) Int. Cl.
*H04N 21/84*    (2011.01)
*H04N 21/482*   (2011.01)
(Continued)

(52) U.S. Cl.
CPC .......... *H04N 21/84* (2013.01); *H04N 21/431* (2013.01); *H04N 21/435* (2013.01);
(Continued)

(58) Field of Classification Search
CPC .... H04N 21/84; H04N 21/482; H04N 21/472; H04N 21/4622; H04N 21/435; H04N 21/6125; H04N 21/431
See application file for complete search history.

(56) References Cited

U.S. PATENT DOCUMENTS

2008/0256578 A1* 10/2008 Narahara ........... H04N 5/44543
                                                              725/45
2010/0287588 A1* 11/2010 Cox .................... H04N 5/44543
                                                              725/40
(Continued)

FOREIGN PATENT DOCUMENTS

| CN | 102263997 A | 11/2011 |
|----|-------------|---------|
| CN | 102547434 A | 7/2012  |
| CN | 103731740 A | 4/2014  |

OTHER PUBLICATIONS

PCT International Search Report and Written Opinion dated Jul. 15, 2015, issued in corresponding International Application No. PCT/CN2015/076410 (8 pages).

*Primary Examiner* — Benjamin R Bruckart
*Assistant Examiner* — Aklil M Tesfaye
(74) *Attorney, Agent, or Firm* — Morgan, Lewis & Bockius LLP

(57) ABSTRACT

The present disclosure provides a channel classification method and device. The method comprising: receiving preset channel tags and content information of channels; the content information includes program contents that individual channels broadcast in periods of time or program content tags corresponding to included non-live contents; classifying the current individual channels according to the channel tags and generating first classification items; determining a program content tag corresponding to the program content or the non-live content that is currently being broadcasted, respectively, according to the program content (Continued)

or the non-live content that is currently being broadcasted by the channels; and classifying the channels according to the program content tag corresponding to the program content or the non-live content that is currently being broadcasted and generating second classification items.

<div style="text-align:center">20 Claims, 6 Drawing Sheets</div>

(51) Int. Cl.
  *H04N 21/472* (2011.01)
  *H04N 21/435* (2011.01)
  *H04N 21/431* (2011.01)
  *H04N 21/61* (2011.01)
  *H04N 21/462* (2011.01)
(52) U.S. Cl.
  CPC ....... *H04N 21/4622* (2013.01); *H04N 21/472* (2013.01); *H04N 21/482* (2013.01); *H04N 21/6125* (2013.01)

(56) References Cited

U.S. PATENT DOCUMENTS

| | | | | |
|---|---|---|---|---|
| 2010/0306806 | A1* | 12/2010 | Kim | H04N 7/17318 725/61 |
| 2010/0313220 | A1* | 12/2010 | Yoon | H04N 5/44543 725/40 |
| 2014/0189743 | A1* | 7/2014 | Kennedy | H04N 21/44222 725/46 |

* cited by examiner

CHANNEL CLASSIFICATION METHODS AND DEVICES

CLAIM FOR PRIORITY

This application is a U.S. national phase entry under 35 U.S.C. § 371 from PCT International Application No. PCT/CN2015/076410 filed on Apr. 13, 2015, which is based upon and claims the benefit of priority from the prior Chinese Patent Application No. 201410186939.1 filed on May 5, 2014. The entire contents of the above applications are incorporated herein by reference.

TECHNICAL FIELD

The present invention relates to the technical field of an intelligent terminal, in particular to channel classification methods and devices.

BACKGROUND OF THE INVENTION

Currently, video live broadcasting technology has been applied widely. Traditional video live broadcasting technology generally transmits digital TV signals by Digital Video Broadcasting (DVB for short). DVB is an internationally recognized digital TV publicity standard. The DVB standard provides ways of wireless transmission such as Satellite TV, Cable TV, Terrestrial TV, Handheld TV, etc. At present, different DVB standards are used to transmit digital TV signals all over the world. In addition, with the development of IP technologies and Internet technologies, IP network transmission-based live channels represented by Internet Protocol Television (IPTV for short) and Internet video have gradually emerged. The above-described types of live channels transmitted through different networks are all called "live channels" in the present invention. The live channels can conduct broadcasting through various terminals such as TVs, mobile phones, tablet PCs, and etc.

With the popularization of intelligent terminals, a terminal equipment such as a digital TV set top box and etc. can, as a platform, provide a user with more service contents, such as Video On Demand (VOD for short) content broadcasting using the VOD technology, media content based on a USB hardware interface of a Set Top Box (STB), game content, and etc. The above-described types of contents are all called "non-live content" in the present invention. In order for users to conveniently access various service contents, the non-live contents can be automatically combined into channels according to a certain business rule, and the users can access different types of non-live contents in a traditional way of switching between channels. Such types of channels that are formed by automatically classifying the non-live contents according to the certain rule can be collectively called "non-live content channels". The above-described "live channels" and "non-live content channels" can be collectively called "channels".

Currently there are numerous channels, in order for the user to conveniently seek the channel that he wants to watch, a current terminal such as a STB and etc. may classify the channels into, for example, a high-definition channel, a satellite TV channel, an on-demand channel, a game channel, and etc. However, the current classification of the channels is excessively broad, and it is difficult for the user to find the program or content that he needs through these excessively broad classification. Therefore, currently it is very complicated to seek the needed channel in a list of channels.

SUMMARY OF THE INVENTION

Embodiments of the present invention provide a channel classification method and device to solve the problem in the prior art that currently it is very complicated to seek the needed channel in a list of channels because the classification of channels is excessively broad.

To achieve the above purpose, the present invention adopts the following technical solutions:

A channel classification method, comprising:

receiving preset channel tags and content information of the channels; the content information includes program contents that individual channels broadcast in periods of time or program content tags corresponding to the included non-live contents;

classifying the current individual channels according to the channel tags, and generating first classification items;

determining a content tag corresponding to the program content or the non-live content that is currently being broadcasted, respectively according to the program content or the non-live content that is currently being broadcasted by the channels;

classifying the channels according to a program content tag corresponding to the program content or the non-live content that is currently being broadcasted, and generating second classification items.

Further, the channel classification method also includes:

transmitting the first classification items and the second classification items to a display device, such that the display device displays the first classification items and the second classification items;

receiving an item selection instruction, transmitting the item selection instruction to the display device, such that the display device displays channel identifiers in the classification item corresponding to the item selection instruction;

receiving a channel identifier selection instruction, transmitting the channel identifier selection instruction to the display device, such that the display device broadcasts the channel corresponding to the channel identifier selection instruction.

Specifically, the preset channel tag includes a user-defined first channel tag and a second channel tag that is sent by a front-end channel server.

Specifically, classifying the current individual channels according to the channel tags and generating first classification items include:

classifying the current individual channels according to the first channel tag, and generating user-defined classification sub items.

Specifically, classifying the current individual channels according to the channel tags and generating first classification items include:

classifying the current individual channels according to the second channel tag, and generating front-end classification sub items.

Specifically, receiving preset channel tags and content information of the channels includes:

receiving the first channel tag that is set by the user, and receiving the program content tag that is sent by the front-end channel server; the program content tag is preset on the front-end channel server.

Specifically, receiving preset channel tags and content information of the channels includes:

receiving the second channel tag and the program content tag that are sent by the front-end channel server and the program content tag; the second channel tag and the program content tag are preset on the front-end channel server.

Specifically, receiving preset channel tags and content information of the channels includes:

receiving the first channel tag that is set by the user, and receiving the second channel tag and the program content tag that are sent by the front-end channel server; the second channel tag and the program content tag are preset on the front-end channel server.

Specifically, classifying the current individual channels according to the second channel tag and generating the front-end classification sub items include:

judging whether or not number of channels with the same second channel tag is larger than or equal to a first threshold value;

if the number of channels with the same second channel tag is larger than or equal to the first threshold value, classifying the current individual channels according to the same second channel tag, and generating the front-end classification sub items corresponding to the same second channel tag.

Specifically, classifying the channels according to the program content tag corresponding to the program content or the non-live content that is currently being broadcasted and generating second classification items include:

judging whether or not number of channels with the same program content tag is larger than or equal to a second threshold value;

if the number of channels with the same program content tag is larger than or equal to the second threshold value, classifying the current individual channels according to the same program content tag, and generating the second classification items corresponding to the same program content tag.

Specifically, determining the program content tag corresponding to the program content or the non-live content that is currently being broadcasted, respectively according to the program content or the non-live content that is currently being broadcasted by the channels includes:

acquiring the program content or the non-live content that is currently being broadcasted by the channels in real time;

when the program content or the non-live content that is currently being broadcasted by a channel changes from a first program content into a second program content, acquiring content information of the second program content;

determining the program content tag corresponding to the channel according to the content information of the second program content.

A channel classification device, comprising:

a channel content reception unit for receiving preset channel tags and content information of the channels; the content information includes program contents that individual channels broadcast in periods of time or program content tags corresponding to the included non-live contents;

a first classification unit for classifying the current individual channels according to the channel tags received by the channel content reception unit, and generating first classification items;

a program content tag determination unit for determining the program content tag corresponding to the program content or the non-live content that is currently being broadcasted, respectively according to the program content or the non-live content that is currently being broadcasted by the channels;

a second classification unit for classifying the channels according to a program content tag corresponding to the program content or the non-live content that is currently being broadcasted, and generating second classification items.

Moreover, the channel classification device further includes:

a transmission unit for transmitting the first classification items generated by the first classification unit and the second classification items generated by the second classification unit to a display device, such that the display device displays the first classification items and the second classification items;

an item selection instruction forwarding unit for receiving an item selection instruction, transmitting the item selection instruction to the display device, such that the display device displays channel identifiers in the classification item corresponding to the item selection instruction;

a channel identifier selection instruction forwarding unit for receiving a channel identifier selection instruction, transmitting the channel identifier selection instruction to the display device, such that the display device broadcasts the channel corresponding to the channel identifier selection instruction.

Specifically, the preset channel tag received by the channel content reception unit includes a user-defined first channel tag and a second channel tag that is sent by a front-end channel server.

Specifically, the first classification unit is used for classifying the current individual channels according to the first channel tag and generating user-defined classification sub items.

Specifically, the first classification unit is used for classifying the current individual channels according to the second channel tag and generating front-end classification sub items.

Specifically, the channel content reception unit is used for receiving the first channel tag that is set by the user, and receiving the program content tag that is sent by the front-end channel server; the program content tag is preset on the front-end channel server.

Moreover, the channel content reception unit is used for receiving the second channel tag and the program content tag that are sent by the front-end channel server; the second channel tag and the program content tag are preset on the front-end channel server.

Specifically, the channel content reception unit is used for receiving the first channel tag that is set by the user, and receiving the second channel tag and the program content tag that are sent by the front-end channel server; the second channel tag and the program content tag are preset on the front-end channel server.

Moreover, the first classification unit is used for judging whether or not number of channels with the same second channel tag is larger than or equal to a first threshold value; if the number of channels with the same second channel tag is larger than or equal to the first threshold value, classifying the current individual channels according to the same second channel tag, and generating the front-end classification sub items corresponding to the same second channel tag.

Specifically, the second classification unit includes:

a judging module for judging whether or not number of channels with the same program content tag is larger than or equal to a second threshold value;

a classification module for, when the judging module judges that the number of channels with the same program content tag is larger than or equal to the second threshold value, classifying the current individual channels according to the same program content tag, and generating the second classification items corresponding to the same program content tag.

Specifically, the program content tag determination unit includes:

a real-time acquisition module for acquiring the program content or the non-live content that is currently being broadcasted by the channels in real time;

the real-time acquisition module is further used for, when the program content or the non-live content that is currently being broadcasted by a channel changes from a first program content into a second program content, acquiring content information of the second program content;

a determination module for determining the program content tag corresponding to the channel according to the content information of the second program content.

The channel classification method and device provided by embodiments of the present invention receive the preset channel tags and content information of the channels. Wherein the content information includes program contents that individual channels broadcast in periods of time or program content tags corresponding to the included non-live contents; afterwards, classifying the current individual channels according to the channel tag, and generating the first classification items; determining the program content tag corresponding to the program content or the non-live content that is currently being broadcasted, respectively according to the program content or the non-live content that is currently being broadcasted by the channels; classifying the channels according to a program content tag corresponding to the program content or the non-live content that is currently being broadcasted, and generating second classification items. In this way, the channels which can respectively belong to the first classification items can also belong to the second classification items in different periods of time, so as to be convenient for seeking for the needed channel in the channels, thereby avoiding the problem in the prior art that currently it is very complicated to seek the needed channel in a list of channels because the classification of channels is excessively broad.

BRIEF DESCRIPTION OF THE DRAWINGS

In order to describe the embodiment of the invention or technical solutions in prior art more clearly, hereinafter accompanying figures required to be used in description of the embodiment or the prior art will be introduced briefly. Obviously, the accompanying figures in the following description are merely some embodiments of the invention, and it is practicable for those skilled in the art to obtain other accompanying figures according to these ones in the premise of making no creative efforts.

DETAILED DESCRIPTION OF THE EMBODIMENT

Hereinafter technical solutions in the embodiments of the invention will be described clearly and completely incorporating accompanying figures in the embodiments of the invention. Obviously, the described embodiments are merely part of embodiments of the invention, but not all of the embodiments. On the basis of the embodiment in the invention, all of the other embodiments obtained by those skilled in the art in the premise that no creative efforts are made fall within the protection scope of the invention.

Figure 1:
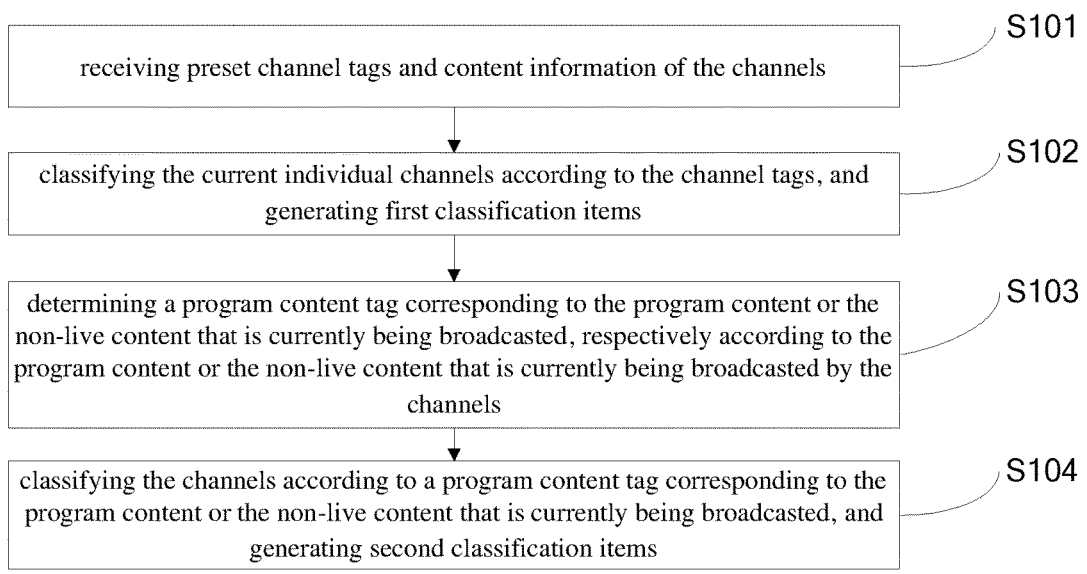
FIG. 1 is a first flowchart of a channel classification method provided by the embodiments of the present invention.

As shown in FIG. 1, the channel classification method provided by the embodiments of the present invention includes:

a step 101 of receiving preset channel tags and content information of the channels.

Wherein the above-described content information includes program contents that individual channels broadcast in periods of time or program content tags corresponding to the included non-live contents.

A step 102 of classifying the current individual channels according to the channel tags, and generating first classification items.

A step 103 of determining a program content tag corresponding to the program content or the non-live content that is currently being broadcasted, respectively according to the program content or the non-live content that is currently being broadcasted by the channels.

A step 104 of classifying the channels according to a program content tag corresponding to the program content or the non-live content that is currently being broadcasted, and generating second classification items.

It is worth noting that, the execution subject of the channel classification method provided by the embodiments of the present invention is a channel classification device, which can be an equipment such as a set top box (STB), a computer, a smartphone, a tablet PC and etc. or can be provided within the equipment such as a set top box (STB), a computer, a smartphone, a tablet PC and etc.

The channel classification method provided by embodiments of the present invention receives the preset channel tags and content information of the channels. Wherein the content information includes program contents that individual channels broadcast in periods of time or program content tags corresponding to the included non-live contents; afterwards, classifying the current individual channels according to the channel tag, and generating the first classification items; determining the program content tag corresponding to the program content or the non-live content that is currently being broadcasted according to the program content or the non-live content that is currently being broadcasted by the channels; classifying the channels according to a program content tag corresponding to the program content or the non-live content that is currently being broadcasted, and generating second classification items. In this way, the channels which can respectively belong to the first classification items can also belong to the second classification items in different periods of time, so as to be convenient for seeking for the needed channel in the list of channels, thereby avoiding the problem in the prior art that currently it is very complicated to seek the needed channel in a list of channels because the classification of channels is excessively broad.

After the first classification item and the second classification item are generated, the following steps can continue, such as:

transmitting the first classification items and the second classification items to a display device, such that the display device displays the first classification items and the second classification items;

receiving an item selection instruction, transmitting the item selection instruction to the display device, such that the display device displays channel identifiers in the classification item corresponding to the item selection instruction;

receiving a channel identifier selection instruction, transmitting the channel identifier selection instruction to the display device, such that the display device broadcasts the channel corresponding to the channel identifier selection instruction.

The above-described display device can be a display device such as a TV, a computer, a tablet PC, a smartphone and etc.

In the above step 101, the preset channel tag includes a user-defined first channel tag and a second channel tag that is sent by a front-end channel server.

The first channel tag can be, for example, channel tags of one or more channels defined by the user. The user can input text in the attribute of the channel, as a channel tag, for example, the user inputs "my favorite" in the attribute of a channel, thereby showing that the channel tag of the channel is "my favorite". Or, the user can directly select one or more of a plurality of channel tags provided by a front-end channel server, as a channel tag, for example, the channel tag provided by the front-end channel server may be "sports", "leisure", "movies", "user's favorite" and etc., and the user can select one or more of the above channel tags as the channel tag of the channel.

The second channel tag can be a channel tag that is distributed directly to the channels by the front-end channel server, such as China Central TV channel (CCTV1), and the front-end channel server can distribute channel tags such as "CCTV", "news", "comprehensives", "politics" and etc., but not limited to this.

Moreover, the above-described step of receiving preset channel tags and content information of the channels can be realized through the following method:

receiving the first channel tag that is set by the user, and receiving the program content tag that is sent by the front-end channel server; or receiving the second channel tag and the program content tag that are sent by the front-end channel server; or receiving the first channel tag that is set by the user, and receiving the second channel tag and the program content tag that are sent by the front-end channel server. Wherein the second channel tag and the program content tag are preset on the front-end channel server.

The above-described program content tag refers to a program content tag of different contents that a channel broadcasts in different periods of time or a program content tag of the applied non-live content, for example, if the CCTV sports channel (CCTV5) broadcasts sports news in a first period of time, then the program content tag of the sports news can be "news", and if the CCTV5 broadcasts a football game on live in a second period of time, then the program content tag of the on-live football game can be "live broadcasting of games", "football", and etc. In addition, for non-live content, it may be for example a video on demand channel, the on-demand content is a football game live recording, and etc., then the program content tag of the football game live recording can be "games rebroadcasting", "football", and etc. Afterwards, the program content tags of the video on demand channel and the CCTV sports channel (CCTV5) both have "football", and the video on demand channel and the CCTV5 can be regarded as one classification.

In addition, the above-described non-live content can also be for example electronic game content, music playing content, and etc. in the STB.

In addition, the above-described classifying the current individual channels according to the channel tags and generating first classification items can include:

classifying the current individual channels according to the first channel tag, and generating user-defined classification sub items. The user-defined classification sub items are a set of channel tags of the channels defined by the user.

Classifying the current individual channels according to the second channel tag, and generating front-end classification sub items. The front-end classification sub items are a set of channel tags that are distributed to the channels by the front-end channel server.

Moreover, the above-described classifying the current individual channels according to the second channel tag and generating the front-end classification sub items include:

judging whether or not number of channels with the same second channel tag is larger than or equal to a first threshold value.

If the number of channels with the same second channel tag is larger than or equal to the first threshold value, classifying the current individual channels according to the same second channel tag, and generating the front-end classification sub items corresponding to the same second channel tag.

In order to avoid there being too much classification caused by classifying each channel tag, as well as disadvantage for the user to search for the needed channel, therefore it is necessary that the number of the channels with the same second channel tag shall be larger than or equal to the first threshold value, and then conducting classification. For example, existing digital TVs all have CCTVs such as CCTV1, CCTV2, CCTV3, and etc., which all have the same channel tag "CCTV", thus a front-end classification sub item that can be generated is "CCTV".

Also, the above-described classifying the channels according to a program content tag corresponding to the program content or the non-live content that is currently being broadcasted, and generating second classification items can also include:

judging whether or not number of channels with the same program content tag is larger than or equal to a second threshold value.

If the number of channels with the same program content tag is larger than or equal to the second threshold value, classifying the current individual channels according to the same program content tag, and generating the second classification items corresponding to the same program content tag.

For example, CCTV1, CCTV5 and Beijing TV news channel (BTV-news) all broadcast news in a first period of time, then the above CCTV1, CCTV5 and BTV-news all have the same program content tag "news" in the first period of time, and the second classification item that can be generated is "news".

In addition, the above-described step of determining a program content tag corresponding to the program content or the non-live content that is currently being broadcasted, respectively according to the program content or the non-live content that is currently being broadcasted by the channels can be realized through the following method:

acquiring the program content or the non-live content that is currently being broadcasted by the channels in real time; when the program content or the non-live content that is currently being broadcasted by a channel changes from a first program content into a second program content, acquiring content information of the second program content; determining the program content tag corresponding to the channel according to the content information of the second program content.

For the live channels, in order to be able to update the classification of the channels in real time, it is necessary to acquire the program content that the channels are currently broadcasting in real time, so as to determine the program content tag corresponding to the channel through the program content that is currently being broadcasted, thereby updating the classification of the channels. For example, if a live channel broadcasts the program content "new" in the first period of time and broadcasts the program content "live broadcasting of games" in the second period of time, then the finally generated classification of the live channel can also change from "news" into "live broadcasting of games", such that one channel can belong to different classifications in different periods of time.

Figure 2:
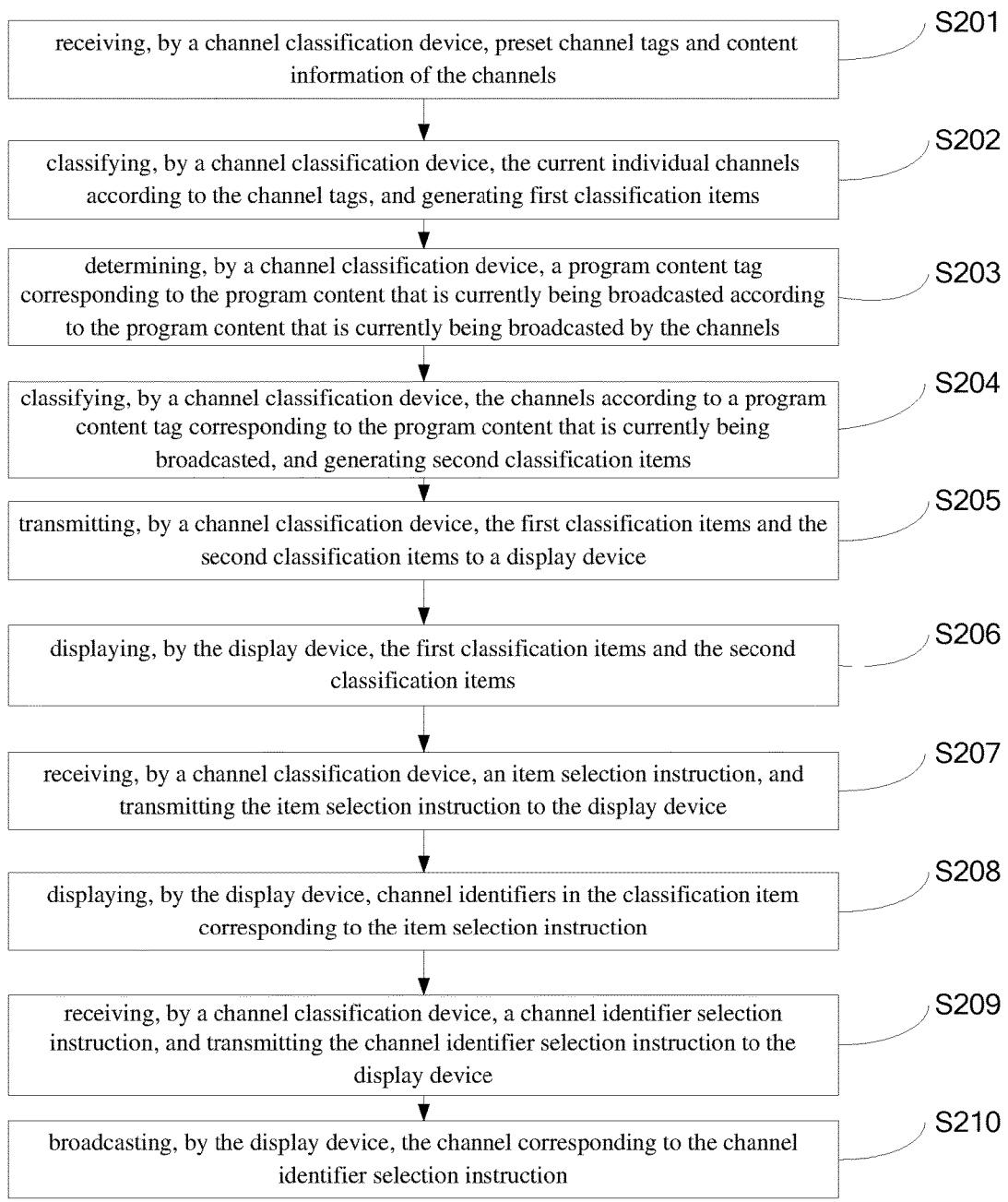
FIG. 2 is a second flowchart of a channel classification method provided by the embodiments of the present invention.

The live channel will be illustrated below taking the ways of classification of three channels in different periods of time as an example, as shown in FIG. 2, the channel classification method provided by the embodiments of the present invention can include:

a step 201 of receiving, by a channel classification device, preset channel tags and content information of the channels.

Wherein the content information includes program content tags corresponding to the program contents that the channels broadcast in the periods of time.

The above-described preset channel tag includes a user-defined first channel tag and a second channel tag that is sent by a front-end channel server.

The first channel tag can be, for example, channel tags of one or more channels defined by the user. The user can input text in the attribute of the channel, as a channel tag, for example, the user inputs "my favorite" in the attribute of a channel, thereby showing that the channel tag of the channel is "my favorite". Or, the user can directly select one or more of a plurality of channel tags provided by a front-end channel server, as a channel tag, for example, the channel tag provided by the front-end channel server may be "sports", "leisure", "movies", "user's favorite" and etc., and the user can select one or more of the above channel tags as the channel tag of the channel.

The second channel tag can be a channel tag that is distributed directly to the channels by the front-end channel server, such as China Central TV channel (CCTV1), and the front-end channel server can distribute channel tags such as "CCTV", "news", "comprehensives", "politics" and etc., but not limited to this.

The step 201 can be realized through the following method:

e.g., receiving the first channel tag that is set by the user, and receiving the program content tag that is sent by the front-end channel server; or receiving the second channel tag and the program content tag that are sent by the front-end channel server; or receiving the first channel tag that is set by the user, and receiving the second channel tag and the program content tag that are sent by the front-end channel server. Wherein the second channel tag and the program content tag are preset on the front-end channel server.

For example, explanation is made taking three channels as an example, the front-end channel server distributes the second channel tags "news" and "CCTV" to the first channel, the first channel broadcasts news in the first period of time and broadcasts entertainment programs in the second period of time; the front-end channel server distributes the second channel tags "teleplay" and "CCTV" to the second channel, the second channel broadcasts news in the first period of time and broadcasts teleplay in the second period of time; the front-end channel server distributes the second channel tags "teleplay" and "BTV" to the third channel, the third channel broadcasts news in the first period of time and broadcasts teleplay in the second period of time. The program content tag of the above-described news program is "news", and the program content tag of the entertainment program is "entertainment", and the program content tag of a movie program is "movie".

A step 202 of classifying, by a channel classification device, the current individual channels according to the channel tags, and generating first classification items.

Here the step 202 can be realized through the following method:

classifying the current individual channels according to the first channel tag, and generating user-defined classification sub items.

The user-defined classification sub items are a set of channel tags of the channels defined by the user. For example, the above-described second channel and third channel are defined by the user as the classification "my favorite".

Or, it is also possible to classify the current individual channels according to the second channel tag, and generate front-end classification sub items. The front-end classification sub items are a set of channel tags that are distributed to the channels by the front-end channel server.

The process of generating the front-end classification sub items can be shown as follows:

firstly it is necessary to judge whether or not number of channels with the same second channel tag is larger than or equal to the first threshold value. If the number of channels with the same second channel tag is larger than or equal to the first threshold value, classifying the current individual channels according to the same second channel tag, and generating the front-end classification sub items corresponding to the same second channel tag.

For example, if the above first threshold value is 2, taking the above-described three channels as example, channels with "CCTV" as the second channel tag are the first channel and the second channel, channels with "teleplay" as the second channel tag are the second channel and the third channel, a channel with "news" as the second channel tag is only the first channel, and a channel with "BTV" as the second channel tag is only the third channel, therefore the front-end classification sub items that can be generated are "CCTV" and "teleplay".

A step 203 of determining, by a channel classification device, a program content tag corresponding to the program content that is currently being broadcasted according to the program content that is currently being broadcasted by the channels.

In order to determine the program content tag corresponding to the program content that is currently being broadcasted, the following method can be used:

acquiring the program content that is currently being broadcasted by the channels in real time; when the program content that is currently being broadcasted by a channel changes from a first program content into a second program content, acquiring content information of the second program content; determining the program content tag corresponding to the channel according to the content information of the second program content.

For example, if a channel broadcasts the program content "new" in the first period of time and broadcasts the program content "live broadcasting of games" in the second period of time, then the finally generated classification of the channel can also change from "news" into "live broadcasting of games", such that one channel belongs to different classifications in different periods of time.

A step 204 of classifying, by a channel classification device, the channels according to a program content tag corresponding to the program content that is currently being broadcasted, and generating second classification items.

The process of generating the second classification items can be shown as follows:

firstly it is necessary to judge whether or not number of channels with the same program content tag is larger than or equal to a second threshold value. If the number of channels with the same program content tag is larger than or equal to the second threshold value, classifying the current individual channels according to the same program content tag, and generating the second classification items corresponding to the same program content tag.

Also, for example, if the above second threshold value is 2, taking the above-described three channels as example, channels with "news" as the program content tag in the first period of time are the first channel, the second channel and the third channel, channels with "movie" as the program content tag in the second period of time are the second channel and the third channel, and a channel with "entertainment" as the program content tag is only the first channel, therefore the second classification items that can be generated are "news" and "movie".

A step 205 of transmitting, by a channel classification device, the first classification items and the second classification items to a display device.

The display device can be a display device such as a TV, a computer, a tablet PC, a smartphone and etc.

A step 206 of displaying, by the display device, the first classification items and the second classification items.

Figure 3:
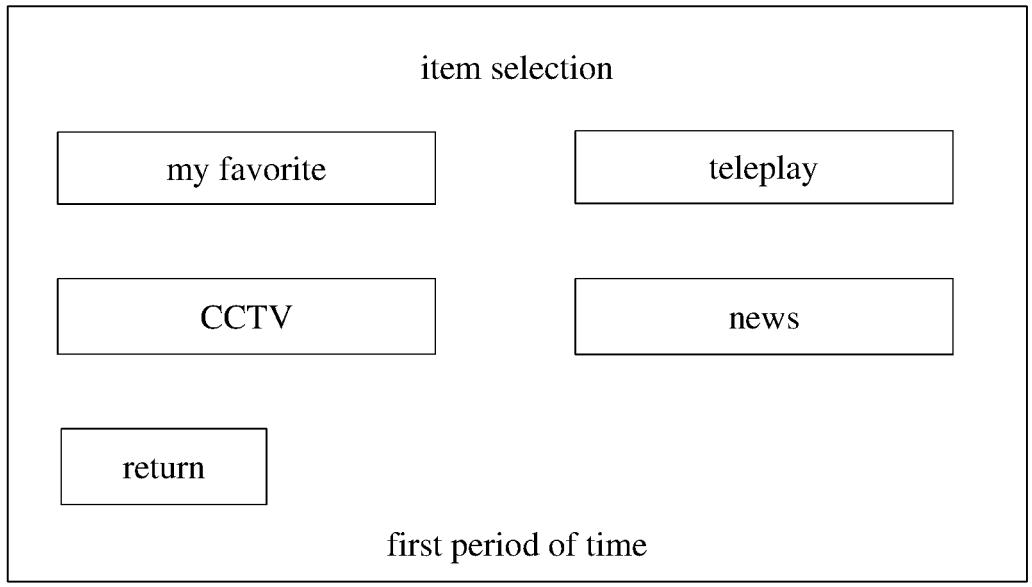
FIG. 3 is a first schematic diagram of a display interface in the embodiments of the present invention.
Figure 3:
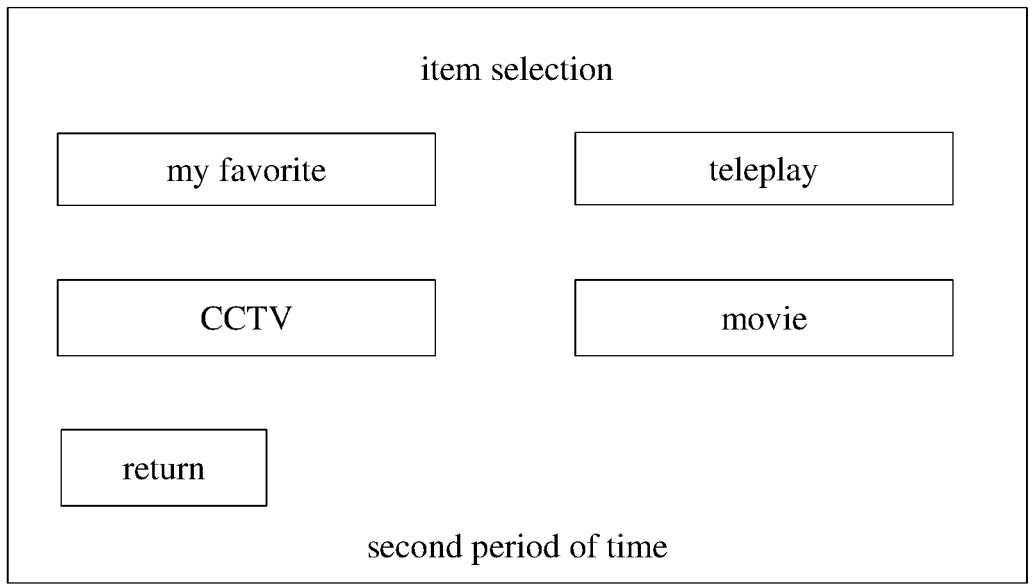

For example, as shown in FIG. 3, if the second channel and the third channel are defined by the user as the classification "my favorite", then the display device can display classification items "my favorite", "teleplay", "CCTV", "news" in the first period of time, can display classification items "my favorite", "teleplay", "CCTV", "movie" in the second period of time.

A step 207 of receiving, by a channel classification device, an item selection instruction, and transmitting the item selection instruction to the display device.

A step 208 of displaying, by the display device, channel identifiers in the classification item corresponding to the item selection instruction.

Figure 4:
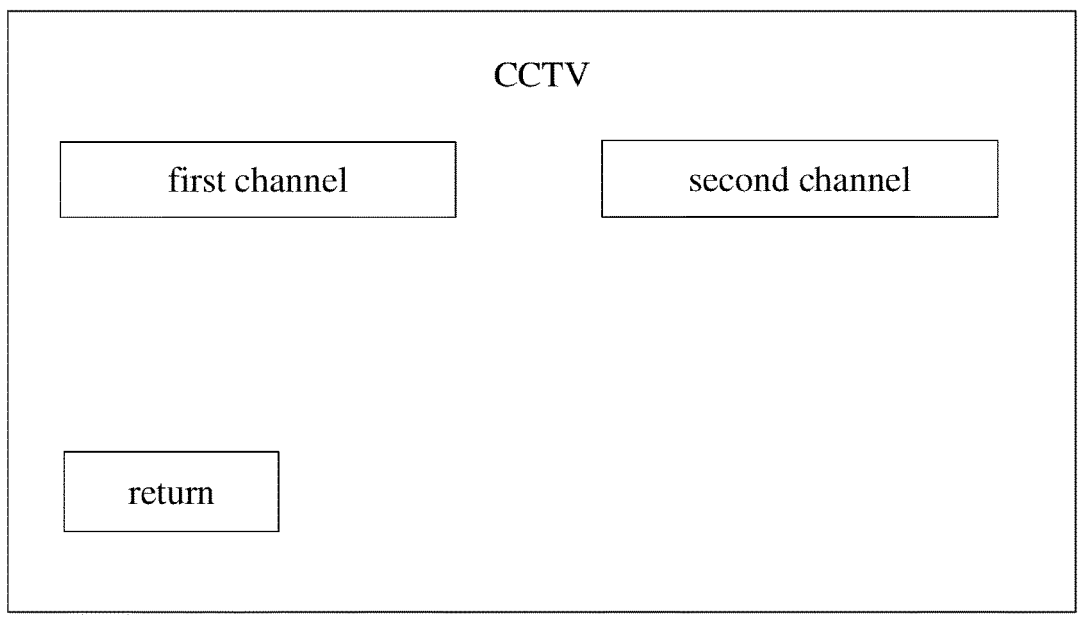
FIG. 4 is a second schematic diagram of a display interface in the embodiments of the present invention.

For example, as shown in FIG. 4, if the item selection instruction instructs that "CCTV" is selected, then the displayed channel identifiers are "the first channel" and "the second channel".

A step 209 of receiving, by a channel classification device, a channel identifier selection instruction, and transmitting the channel identifier selection instruction to the display device.

A step 210 of broadcasting, by the display device, the channel corresponding to the channel identifier selection instruction.

The channel classification method provided by embodiments of the present invention receives the preset channel tags and content information of the channels. Wherein the content information includes program content tags corresponding to the program contents that the channels broadcast in the periods of time; afterwards, classifying the current individual channels according to the channel tags, and generating first classification items; determining a program content tag corresponding to the program content that is currently being broadcasted according to the program content that is currently being broadcasted by the channels; classifying the channels according to a program content tag corresponding to the program content that is currently being broadcasted, and generating second classification items. In this way, the channels which can respectively belong to the first classification items can also belong to the second classification items in different periods of time, so as to be convenient for seeking for the needed channel in the list of channels, thereby avoiding the problem in the prior art that currently it is very complicated to seek the needed channel in a list of channels because the classification of channels is excessively broad.

Figure 5:
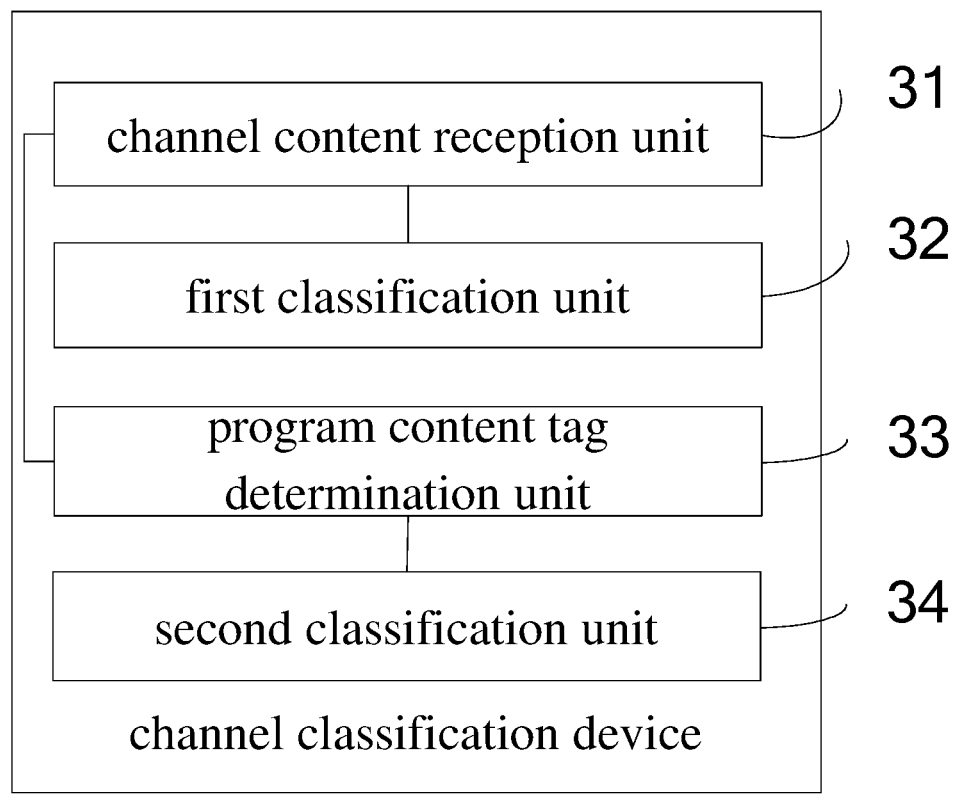
FIG. 5 is a first structural schematic diagram of a channel classification device provided by the embodiments of the present invention.

Corresponding to the above embodiments of methods of FIGS. 1 and 2, as shown in FIG. 5, the present invention provides a channel classification device which can include: a channel content reception unit 31, a first classification unit 32, a program content tag determination unit 33 and a second classification unit 34.

The above channel content reception unit 31 can receive preset channel tags and content information of the channels.

Wherein the content information includes program contents that individual channels broadcast in periods of time or program content tags corresponding to the included non-live contents.

The above first classification unit 32 can classify the current individual channels according to the channel tags received by the channel content reception unit, and generate first classification items.

The program content tag determination unit 33 can determine the program content tag corresponding to the program content that is currently being broadcasted, respectively according to the program content or the non-live content that is currently being broadcasted by the channels.

The above second classification unit 34 can classify the channels according to a program content tag corresponding to the program content or the non-live content that is currently being broadcasted, and generate second classification items.

Figure 6:
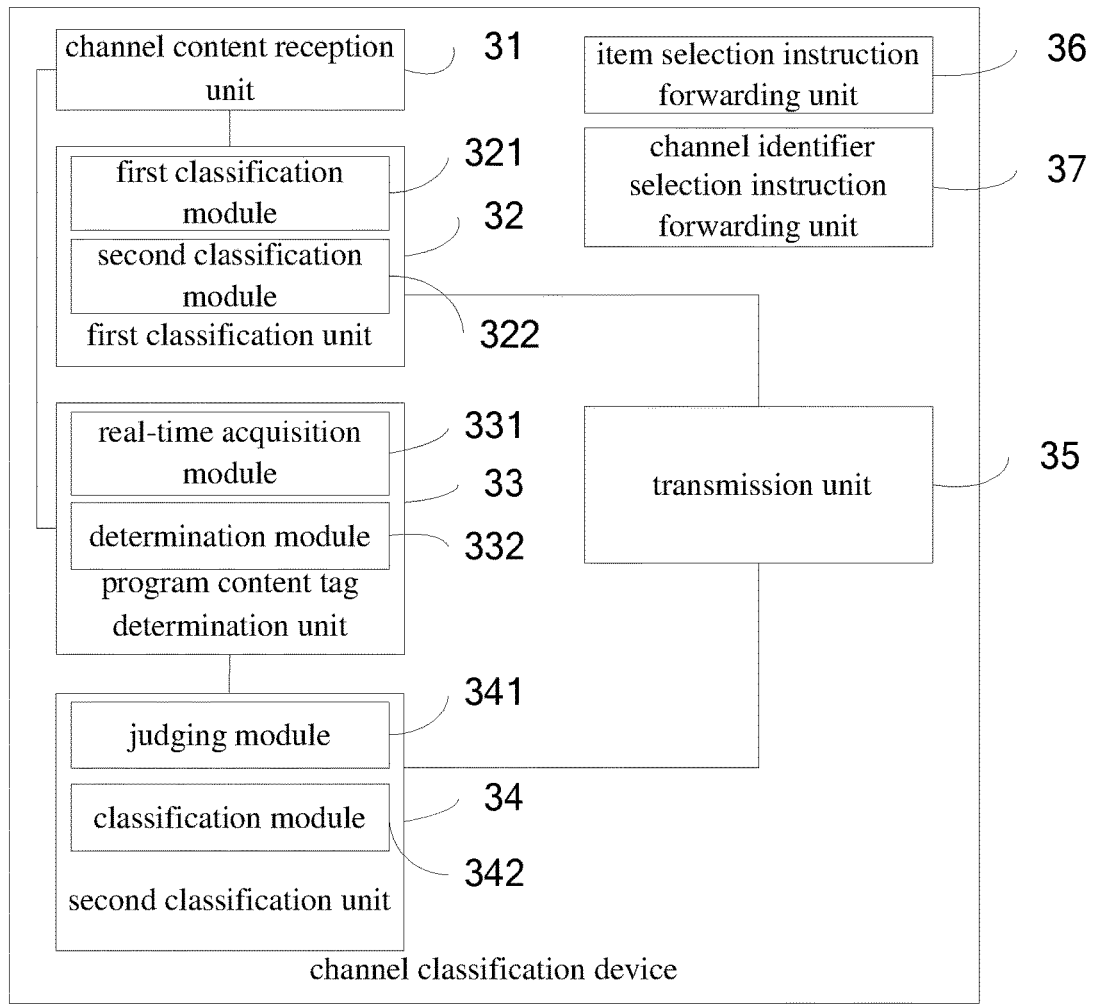
FIG. 6 is a second structural schematic diagram of a channel classification device provided by the embodiments of the present invention.

In addition, as shown in FIG. 6, the channel classification device can further include: a transmission unit 35, an item selection instruction forwarding unit 36 and a channel identifier selection instruction forwarding unit 37.

The above transmission unit 35 can transmit the first classification items generated by the first classification unit 32 and the second classification items generated by the second classification unit 34 to a display device, such that the display device displays the first classification items and the second classification items.

The above item selection instruction forwarding unit 36 can receive an item selection instruction, transmit the item selection instruction to the display device, such that the display device displays channel identifiers in the classification item corresponding to the item selection instruction.

The channel identifier selection instruction forwarding unit 37 can receive a channel identifier selection instruction, transmit the channel identifier selection instruction to the display device, such that the display device broadcasts the channel corresponding to the channel identifier selection instruction.

The preset channel tag received by the above channel content reception unit 31 includes a user-defined first channel tag and a second channel tag that is sent by a front-end channel server.

Moreover, the channel content reception unit 31 can receive the first channel tag that is set by the user, and receiving the program content tag that is sent by the front-end channel server; or receiving the second channel tag and the program content tag that are sent by the front-end channel server; or receiving the first channel tag that is set by the user, and receiving the second channel tag and the program content tag that are sent by the front-end channel server. Wherein the second channel tag and the program content tag are preset on the front-end channel server.

In one embodiment, as shown in FIG. 6, the first classification unit 32 can include:

a first classification module 321 which can classify the current individual channels according to the first channel tag, and generate user-defined classification sub items.

a second classification module 322 which can classify the current individual channels according to the second channel tag, and generate front-end classification sub items.

The above second classification module can further judge whether or not number of channels with the same second channel tag is larger than or equal to a first threshold value. If the number of channels with the same second channel tag is larger than or equal to the first threshold value, classifying the current individual channels according to the same second channel tag, and generating the front-end classification sub items corresponding to the same second channel tag.

In one embodiment, as shown in FIG. 6, the above second classification unit 34 can include:

a judging module 341 which can judge whether or not number of channels with the same program content tag is larger than or equal to a second threshold value.

a classification module 342 which can, when the judging module 341 judges that the number of channels with the same program content tag is larger than or equal to the second threshold value, classify the current individual channels according to the same program content tag, and generate the second classification items corresponding to the same program content tag.

In addition, as shown in FIG. 6, the above program content tag determination unit 33 can include:

a real-time acquisition module 331 which can acquire the program content or non-live content that is currently being broadcasted by the channels in real time; and when the program content or the non-live content that is currently being broadcasted by a channel changes from a first program content into a second program content, acquire content information of the second program content.

the non-live content acquired by the real-time acquisition module 331 can be for example video on demand content, electronic game content, audio on demand content, and etc., but not limited to this.

a determination module 332 which can determine the program content tag corresponding to the channel according to the content information of the second program content.

It is worth noting that, specific implementations of the channel classification device provided by the embodiments of the present invention can refer to corresponding embodiments of the method in FIGS. 1 and 2, and here will not be repeated.

The channel classification device provided by embodiments of the present invention receives the preset channel tags and content information of the channels. Wherein the content information includes program contents that individual channels broadcast in periods of time or program content tags corresponding to the non-live contents. Afterwards, classifying the current individual channels according to the channel tags, and generating first classification items; determining a program content tag corresponding to the program content or the non-live content that is currently being broadcasted, respectively according to the program content or the non-live content that is currently being broadcasted by the channels; classifying the channels according to the program content tag, and generating second classification items. In this way, the channels which can respectively belong to the first classification items can also belong to the second classification items in different periods of time, so as to be convenient for seeking for the needed channel in the list of channels, thereby avoiding the problem in the prior art that currently it is very complicated to seek the needed channel in a list of channels because the classification of channels is excessively broad.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for being used in the steps of achieving functions designated in one or more flows in the flow diagrams and/or one or more blocks in the block diagrams.

The invention adopts specific embodiments to explain the principle and implementation way of the invention. The above embodiments are described merely for helping to understand the method and core concept of the invention; in addition, a person skilled in the art can, on the basis of the concept of the invention, make modifications to both of the specific embodiments and application scope. In conclusion, contents disclosed herein should not be understood as limitation to the invention.

The invention claimed is:

1. A channel classification method, comprising:
receiving, at a channel classification device comprising a Set Top Box, preset channel tags and content information of channels, the content information comprising first program-content tags corresponding to first live program contents broadcasted on the channels in each time period and first non-live contents available on the channels;
classifying the channels according to the preset channel tags and generating first classification items;
acquiring live program content and non-live content that are currently being broadcasted by each channel in real time;
determining second program-content tags corresponding to second live program contents and second non-live contents currently being broadcasted on all the channels, according to the second live program contents and the second non-live contents of all the channels that are currently being broadcasted on all the channels;
classifying the channels according to the second program-content tags and generating second classification items, wherein the channels that belong to the same first classification items belong to respective different second classification items in different periods of time, the different periods of time corresponding to different second program-content tags for each channel, and
displaying the first classification items and the second classification items without channel identifier for each channel;
wherein the preset channel tags comprise user-defined first channel tags and second channel tags that are transmitted by a front-end channel server, the user-defined first channel tags comprising channel tags defined and entered by a user for one or more of the channels or user-selected one or more of channel tags provided by the front-end channel server;
wherein classifying the channels according to the preset channel tags and generating first classification items comprises:
selecting one or more of the first channel tags for each channel as defined channel tags for the channel,
classifying each of the channels according to the defined channel tags, respectively,
generating the first classification items, and
further generating user-defined classification sub-items,
wherein the first classification items are only generated and displayed when a number of channels with the same second channel tags is larger than or equal to a first threshold value, and
wherein the second classification items are only generated and displayed when a number of channels with the same second program-content tags is larger than or equal to a second threshold value.

2. The channel classification method according to claim 1, further comprising:
transmitting, via the channel classification device, the first classification items and the second classification items to a display device to display the first classification items and the second classification items;
receiving an item selection instruction, transmitting the item selection instruction to the display device to display channel identifiers in the classification items corresponding to the item selection instruction;
receiving a channel identifier selection instruction; and
transmitting the channel identifier selection instruction to the display device, to play the channel corresponding to the channel identifier selection instruction.

3. The channel classification method according to claim 2, wherein server displaying the first classification items and the second classification items without channel identifier for each channel comprises:
displaying a first sub-item of the second classification items in a first period of time; and
displaying a second sub-item of the second classification items in a second period of time.

4. The channel classification method according to claim 1, wherein classifying the channels according to the preset channel tags and generating the first classification items comprises:
classifying the channels according to the second channel tags; and
generating front-end classification sub-items.

5. The channel classification method according to claim 1, wherein receiving preset channel tags and content information of the channels comprises:
receiving, at the channel classification device, the first channel tags that are set by the user; and
receiving the first program-content tags that are sent by the front-end channel server;
wherein the first program content tags are preset on the front-end channel server.

6. The channel classification method according to claim 4, wherein receiving the preset channel tags and content information of the channels comprises:
receiving, at the channel classification device, the second channel tags and the first program-content tags that are sent by the front-end channel server;
wherein the second channel tags and the first program-content tags are preset on the front-end channel server.

7. The channel classification method according to claim 1, wherein receiving preset channel tags and content information of the channels comprises:
receiving the first channel tags that are set by the user; and
receiving the second channel tags and the first program-content tags that are sent by the front-end channel server;
wherein the second channel tags and the first program-content tags are preset on the front-end channel server.

8. The channel classification method according to claim 4, wherein classifying the channels according to the second channel tags and generating the front-end classification sub-items comprises:
judging the number of channels with the same second channel tags is larger than or equal to the first threshold value; and
upon judging the number of channels with the same second channel tags is larger than or equal to the first threshold value, classifying the channels according to the same second channel tags, and generating the front-end classification sub-items corresponding to the same second channel tags.

9. The channel classification method according to claim 2, wherein classifying the channels according to the second program-content tags and generating second classification items comprises:
judging whether the number of channels with the same second program-content tags is larger than or equal to the second threshold value, wherein
upon judging the number of channels with the same second program-content tags is larger than or equal to the second threshold value, classifying the channels according to the same second program-content tags, and generating the second classification items corresponding to the same second program-content tags.

10. The channel classification method according to claim 2, wherein determining the second program-content tags corresponding to the second live program contents and the second non-live contents currently being broadcasted on all the channels according to the second live program contents and the second non-live contents that are currently being broadcasted on all the channels comprises:
when a live program content or a non-live content that is currently being broadcasted on a channel changes from a first program content into a second program content, acquiring content information of the second program content; and
determining a program-content tag corresponding to the channel according to the content information of the second program content.

11. A channel classification device comprising:
a Set Top Box that is to:
receive preset channel tags and content information of channels, the content information comprising first program content tags corresponding to first live program contents broadcasted on the channels in each time period and non-live contents available on the channels;
classify the channels according to the preset channel tags, and generate first classification items;
acquire live program content and non-live content that are currently being broadcasted by each channel in real time;
determine second program-content tags corresponding to second live program contents and second non-live contents currently being broadcasted on all the channels, according to the second live program content and the second non-live contents of all the channels that are currently being broadcasted on all the channels;
classify the channels according to the second program-content tags and generate second classification items, wherein the channels that belong to the same first classification items belong to respective different second classification items in different periods of time, the different periods of time corresponding to different second program-content tags for each channel; and
display the first classification items and the second classification items without channel identifier for each channel;
wherein:
the preset channel tags comprise user-defined first channel tags and second channel tags that are transmitted by a front-end channel server, the user-defined first channel tag comprising channel tags defined and entered by a user for one or more channels or user-selected one or more of channel tags provided by the front-end channel server;
the Set Top Box is further to:
select one or more of the first channel tags for each channel as defined channel tags for the channel; and
classify each of the channels according to the first channel tags, and generate user-defined classification sub-items,
the first classification items are only generated and displayed when a number of channels with the same second channel tags is larger than or equal to a first threshold value, and
the second classification items are only generated and displayed when a number of channels with the same second program-content tags is larger than or equal to a second threshold value.

12. The channel classification device according to claim 11, wherein the Set Top Box is further to:
transmit the first classification items and the second classification items generated to a display device for displaying the first classification items and the second classification items;
receive an item selection instruction, and t-e transmit the item selection instruction to the display device for displaying channel identifiers in the classification item corresponding to the item selection instruction;
receive a channel identifier selection instruction and transmit the channel identifier selection instruction to the display device for playing the channel corresponding to the channel identifier selection instruction.

13. The channel classification device according to claim 12, wherein the Set Top Box is further to:
display a first sub-item of the second classification items in a first period of time; and
display a second sub-item of the second classification items in a second period of time.

14. The channel classification device according to claim 11, wherein the Set Top Box is further to classify the channels according to the second channel tags, and generate front-end classification sub-items.

15. The channel classification device according to claim 11, wherein the Set Top Box is further to receive the first channel tags that are set by the user, and the first program-content tags that are sent by the front-end channel server, wherein the first program-content tags are preset on the front-end channel server.

16. The channel classification device according to claim 14, wherein:
the Set Top Box is further to receive the second channel tags and the first program-content tags that are sent by the front-end channel server; and
the second channel tags and the first program-content tags are preset on the front-end channel server.

17. The channel classification device according to claim 11 wherein:
the Set Top Box is further to receive the first channel tags that are set by the user and the second channel tags and the first program-content tags that are sent by the front-end channel server; and
the second channel tags and the first program-content tags are preset on the front-end channel server.

18. The channel classification device according to claim 14, wherein the Set Top Box is further to:
judge whether the number of channels with the same second channel tags is larger than or equal to the first threshold value;
upon judging the number of channels with the same second channel tags is larger than or equal to the first threshold value, classify the channels according to the same second channel tags, and generate the front-end classification sub-items corresponding to the same second channel tags.

19. The channel classification device according to claim 12, wherein the Set Top Box is further to:
judge whether the number of channels with the same second program-content tags is larger than or equal to the second threshold value;

when the judging module judges that the number of channels with the same second program-content tags is larger than or equal to the second threshold value, classify the channels according to the same second program-content tags, and generate the second classification items corresponding to the same second program content tags.

20. The channel classification device according to claim 12, wherein the Set Top Box is further to:
when a program content or a non-live content that is currently being broadcasted on a channel changes from a first program content into a second program content, acquire content information of the second program content; and
determine a program content tag corresponding to the channel according to the content information of the second program content.

* * * * *